United States Patent Office 3,523,950
Patented Aug. 11, 1970

3,523,950
CERTAIN 4 - PHENYL - 1,2,3,6 - TETRAHYDRO-PYRIDYL-N-LOWER ALKYLENE-UREAS AND DERIVATIVES
Grover Cleveland Helsley, Richmond, Va., assignor to A. H. Robins Company, Incorporated, Richmond, Va., a corporation of Virginia
No Drawing. Filed Dec. 13, 1967, Ser. No. 690,097
Int. Cl. C07d 31/40
U.S. Cl. 260—295                                    4 Claims

ABSTRACT OF THE DISCLOSURE

There are disclosed compositions of matter classified in the art of chemistry as derivatives of arylpyridinyl-alkyl alcohols and arylpyridinyl-alkylamines as well as processes for making and using such compositions.

The novel chemical compounds are represented by the following formula:

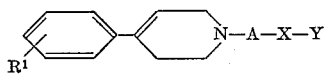

wherein R' represents hydrogen, lower alkyl, lower alkoxy or trifluoromethyl, A represents alkylene having 2 to 4 carbon atoms or hydroxy substituted alkylene having 4 carbon atoms, X represents one of the groups —O—C(O)— or —NR$^2$—C(O)—, wherein R$^2$ is hydrogen or lower alkyl, Y represents phenyl, substituted phenyl, and —NR$^3$R$^4$ wherein R$^3$ and R$^4$ each represent hydrogen, lower alkyl, or one of said terms R$^3$ and R$^4$ represents phenyl, trifluoromethyl phenyl, lower-alkoxyphenyl and the other hydrogen.

The pharmaceutically acceptable acid addition salts of the arylpyridinyl-alkyl alcohol and arylpyridinyl-alkyl-amine derivatives embraced by the above formula are also included within the scope of this invention.

---

This invention relates to compositions of matter classified in the art of chemistry as arylpyridinyl-alkyl alcohol-arylpyridinyl alkylamine derivatives and to processes for making and using such compositions.

The compounds of this invention are represented by the following formula:

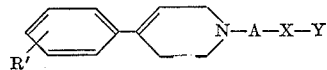
Formula I wherein R' represents hydrogen, lower alkyl, lower alkoxy, or trifluoromethyl, A represents alkylene having 2 to 4 carbon atoms or hydroxy substituted alkylene having 4 carbon atoms, X represent one of the groups —O—C(O)— or —NR$^2$—C(O)—, wherein R$^2$ is hydrogen or lower alkyl and Y represents phenyl, substituted phenyl and —NR$^3$R$^4$ wherein R$^3$ and R$^4$ each represent hydrogen, lower alkyl, or one of said terms R$^3$ and R$^4$ represents phenyl, trifluoromethylphenyl, methoxyphenyl and the other hydrogen.

The chemical compounds having a molecular structure corresponding to the following formula:

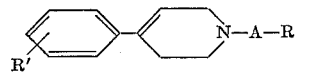
Formula II wherein R' and A are as above defined, and R is an —OH, —NH$_2$ or a —NHCH$_3$ group represent compounds useful as starting materials in the preparation of the novel compounds represented by Formula I.

The pharmaceutically acceptable acid addition salts of the compounds of Formula I are also included within the scope of this invention. The salts have the advantages of water solubility, heat solubility, or both, as compared with the free bases from which they are derived. Both organic and inorganic acids can be employed to form pharmaceutically acceptable salts with the various arylpyridinyl-alkyl bases, illustrative acids being hydrochloric acid, hydrobromic acid, sulfuric acid, phosphoric acid, maleic acid, acetic acid, benzoic acid, succinic acid, citric acid, ascorbic acid, and the like.

While all of the compounds corresponding to Formula I possess therapeutic activity as tranquilizing agents as demonstrated by accepted experimental procedures [DaVanzo, J. P. et al., Psychopharmacologia 9, 210 (1966)], the compounds of Examples 10, 13 and 17 are preferred. The above examples have, respectively, an ED$_{50}$ of 7.1, 5.8 and 8.5 mg./kg. The ED$_{50}$ was determined by the injection of the appropriate number of doses to mice and subjecting the results to probit analysis according to the method of J. T. Litchfield and F. Wilcoxon, J. Pharm. and Exptl. Therap., 96, 99 (1949).

In the definition of the symbols in the foregoing Formulae I–II, and where they appear elsewhere throughout the specification, and claims hereof, the terms used herein have the following significance.

The term "lower alkyl" includes straight and branched chain radicals of up to eight carbon atoms inclusive and is exemplified by such groups as methyl, ethyl, propyl, butyl, isobutyl, tertiary butyl, amyl, isoamyl, hexyl, heptyl, octyl and the like.

The term "lower alkoxy" has the formula —O—lower alkyl.

A "substituted phenyl" radical is a phenyl radical substituted by any radical or radicals which are not reactive or otherwise interfering under the conditions of reaction in preparing the desired compound, such radicals including lower alkoxy, lower alkyl, di-lower-alkylamino, trifluoromethyl, and the like. The foregoing substituents can be in various available positions of the phenyl nucleus.

The term "substituted benzyl" has the formula —CH$_2$— substituted phenyl.

The starting materials (Formula II) can be prepared according to the following general procedures.

The precursor materials of Formula II, the 4-aryl-1,2,3,6-tetrahydropyridines, are in some instances commercially available or they can be readily prepared by standard laboratory procedures as hereinafter described.

Commercially available 1-benzyl-4-pyridone is dissolved in anhydrous ether and the ethereal solution added to a stirred ethereal mixture of a suitable Grignard reactant as, for example, an aryl magnesium bromide to give the corresponding 1-benzyl-4-hydroxy-4-aryl pyridine. Catalytic hydrogenolysis of the aforementioned material in a suitable solvent as, for example, a lower alkanol at 2–3 atmospheres of hydrogen and at a temperature from about 20° C. to about 80° C. using a palladium on charcoal catalyst gives 4-hydroxy-4-aryl pyridine. The isolated debenzylated material is gently refluxed in 2–8 normal hydrochloric acid for from about 3 hours to about 24 hours. Hydrochloric acid of about 6 normal is preferably used. The reflux period is dependent on the material being dehydrated, the minimum period necessary to obtain complete dehydration being preferred to prevent deleterious results due to a prolonged period of reflux. Basification of the acidic hydrolyzate, and extraction of the basic mixture using a suitable solvent such as ether, benzene, ethyl acetate, and the like and evaporation of the solvent leaves the crude 4-aryl-1,2,3,6-tetrahydropyridine which can be purified by suitable methods as, for example, distillation.

The reaction of a 4-aryl-1,2,3,6-tetrahydropyridine and a omega-halo alkanol in a lower alkanol solvent such as ethanol in the presence of an acid acceptor as, for example, sodium carbonate, sodium acid carbonate, potassium carbonate and the like and at the reflux temperature of the lower alkanol solvent gives the desired 1-(ω-hydroxyalkyl)-4-aryl-1,2,3,6-tetrahydropyridine corresponding to Formula II wherein R of the aforementioned formula is an —OH group.

The preparation of a compound of Formula II wherein said R is an —$NH_2$ group is readily carried out by refluxing with stirring a mixture of a 4-aryl-1,2,3,6-tetrahydropyridine and an N-(ω-haloalkyl)-phthalimide in a non-reactive organic solvent as, for example, toluene containing an acid binding agent as hereinabove described to give a 1 - (ω - phthalimidoalkyl)-4-aryl-1,2,3,6-tetrahydropyridine. Treatment of the latter compound in ethanol solution with an excess of 99% hydrazine gives the desired 1 - (ω - aminoalkyl) - 4 - aryl - 1,2,3,6 - tetrahydropyridine.

The preparation of a compound of Formula II wherein said R is an —$NHCH_3$ group is readily obtained by alkaline hydrolysis of a 3-methyl-5-[2-(4-phenyl-1,2,3,6-tetrahydropyridinyl)-ethyl]-2-oxazolidinone as more fully described hereinafter in Example 4.

The compounds corresponding to Formula I wherein X is —$NR^2C(O)$— can be prepared by the following general methods.

A solution of a 4-aryl-1-(ω-aminoalkyl)-1,2,3,6-tetrahydropyridine in a non-reactive organic solvent such as ether is stirred and treated dropwise with an ethanol solution of a lower alkyl isocyanate at a temperature from about 0° to about 10° C. Following the addition the stirred mixture is allowed to come to room temperature and is stirred from about 2 to about 14 hours at ambient temperature. The reaction period is not critical, sufficient time being allowed to insure complete reaction. The urea products are, in general, crystalline materials which are readily separated from the reaction mixture by filtration.

In a second procedure a 4-aryl-1-(ω-aminoalkyl)-1,2,3,6-tetrahydropyridine and urea is fused at 150° C.–180° C., preferably from about 160° C. to 170° C. in an atmosphere of nitrogen, from about 15 minutes to about 60 minutes. The crude fusion mixture is cooled, and the product isolated by crystallization from a suitable solvent.

The compounds corresponding to Formula I wherein X is —O—C(O)— can be prepared by the following general methods.

A stirred solution of a 4-aryl-1-(ω-hydroxyalkyl)-1,2,3,6-tetrahydropyridine in a dry non-reactive organic solvent such as benzene, toluene, xylene, and the like is treated with a solution of an aryl carbamyl halide, a lower alkyl isocyanate or an aryl isocyanate in a dry organic solvent as hereinbefore mentioned, benzene being the preferred solvent. The addition is carried out slowly, at or near room temperature and optionally under an atmosphere of an inert gas, preferable nitrogen. Subsequent to the addition the reaction mixture is stirred from about 12 hours to about 40 hours at ambient temperature or at gentle reflux. Generally speaking a reaction period of 14 to 16 hours at ambient temperature is sufficient to complete the reaction. It is only necessary to use longer reaction times and higher temperatures when less reactive materials are used. Isolation of the product is readily effected by evaporation of the solvent and crystallization of the crude residue using an appropriate solvent.

The following examples are illustrative only and should not be construed as limiting the invention which is properly delineated in the appended claims.

EXAMPLE 1

1-(3-hydroxypropyl)-4-phenyl-1,2,3,6-tetrahydropyridine hydrochloride

A mixture of 79.5 g. (0.5 mole) of 4-phenyl-1,2,3,6-tetrahydropyridine, 69.5 g. (0.5 mole) of trimethylene bromohydrin, 50 g. of potassium carbonate and 400 ml. of absolute ethanol was heated at reflux for three hours, filtered and the solvent evaporated at reduced pressure. The residual oil was made basic with 50% sodium hydroxide and thereafter extracted with chloroform. The combined extracts were washed with water and the solvent evaporated. The residual oil was distilled at reduced pressure and the fraction boiling at 138–140° C./.01 mm. collected. The colorless viscous oil distillate crystallized on standing, weighed 38.4 g. (36% yield) and melted at 45°–47° C.

A portion (5.0 g.) of the free base was dissolved in dry ether and treated with an ether-hydrogen chloride solution. The white crystalline hydrochloride salt which formed on standing was recrystallized from an isopropanol-isopropyl-ether mixture. The compound weighed 4.1 g. and melted at 129°–130° C.

*Analysis.*—Calculated for $C_{14}H_{20}NOCl$ (percent): C, 66.26; H, 7.94; N, 5.52. Found (percent): C, 66.15; H, 7.90; N, 5.51.

Utilizing the method of Example 1 the following compounds are prepared from the stated ingredients.

1 - (2 - hydroxyethyl) - 4 - phenyl - 1,2,3,6 - tetrahydropyridine from 4-phenyl-1,2,3,6-tetrahydropyridine and 2-bromoethanol.

4 - (4 - ethylphenyl) - 1 - (3 - hydroxypropyl) - 1,2,3,6-tetrahydropyridine from 4-(4-ethylphenyl)-1,2,3,6-tetrahydropyridine and trimethylene bromohydrin.

1 - (3 - hydroxypropyl) - 4 - (4 - methoxyphenyl) - 1,2,3,6-tetrahydropyridine from 4-(4-methoxyphenyl)-1,2,3,6-tetrahydropyridine and trimethylene bromohydrin.

EXAMPLE 2

1-(3-aminopropyl)-4-phenyl-1,2,3,6-tetrahydropyridine dihydrochloride

In 2 liters of ethanol 190, there were dissolved 280 g. (0.9 mole) of 1-(4-phenyl-1,2,3,6-tetrahydropyridine)-3-phthalimido propane and 46.3 g. (1.4 mole) of 97% hydrazine. The solution was warmed to 90° C. with stirring and the phthalhydrazide which was thereby formed separated out of solution after 1 hour of heating. The cooled reaction mixture was filtered and the filtrate acidified with dilute HCl and evaporated to about half of its volume. The cooled acid concentrate was extracted with ether, the ether extracts discarded, the aqueous acid layer made basic with 6 N NaOH and extracted with $CHCl_3$. The $CHCl_3$ extracts were washed with water and dried over $Na_2SO_4$. Following evaporation of the $CHCl_3$, an oil remained which was vacuum distilled (B.P. 119–121° C./0.019 mm.). Seventy-six and six-tenths grams of pure product (39% yield) was obtained.

A sample was converted to the dihydrochloride salt with ethereal-HCl and the dihydrochloride salt recrystallized from isopropanol and isopropyl ether to give white crystals melting at 93–94° C.

*Analysis.*—Calculated for $C_{14}H_{22}Cl_2N_2$ (percent): C, 58.13; H, 7.67; N, 9.69. Found (percent): C, 58.32; H, 7.84; N, 9.76.

EXAMPLE 3

1-(3-hydroxypropyl)-4-(m-trifluoromethylphenyl)-1,2,3,6-tetrahydropyridine hydrochloride A mixture of 37.0 g. (0.16 mole) of 4-(m-trifluoromethylphenyl)-1,2,3,6-tetrahydropyridine, 22.2 g. (0.16 mole) of trimethylene bromohydrin, 40 g. of potassium carbonate and 500 ml. of dry toluene was stirred two hours at room temperature and then at reflux for six hours. Water (200 ml.) was added to the cooled reaction mixture and the organic layer separated. The separated organic layer was washed with water and the solvent evaporated. The residual oil was distilled under vacuum, and the fraction boiling at 124–128° C./0.01 mm. was collected. The viscous oil weighed 19 g. (42% yielded).

A portion of the free base (2.0 g.) was dissolved in isopropanol and treated with an ether-hydrogen chloride solution. The white crystalline solid which formed immediately was recrystallized from isopropanol. The compound weighed 1.4 g. and melted at 219–221° C. The melting point was unchanged after the salt was recrystallized again from the same solvent.

*Analysis.*—Calculated for $C_{15}H_{19}F_3NOCl$ (percent): C, 55.99; H, 5.95; N, 4.35. Found (percent): C, 56.05; H, 5.75; N, 4.27.

EXAMPLE 4

1-(4-methylamino-3-hydroxybutyl)-4-phenyl-1,2,3,6-tetrahydropyridine

A 10 g. sample of 3-methyl-5-[2-(4-phenyl-1,2,3,6-tetrahydropyridinyl)-ethyl]-2-oxazolidinone was refluxed in 250 ml. of 1–1 absolute ethanol-2 N sodium hydroxide for 2 hours. The resulting solution was concentrated in vacuo to one half of its volume and extracted with chloroform. Evaporation of the chloroform extract gave 7.0 g. of product which melted at 88–89° C. after recrystallization from isopropyl ether. The yield amounted to 84%.

*Analysis.*—Calculated for $C_{16}H_{24}N_2$ (percent): C, 73.80; H, 9.29; N, 10.76. Found (percent): C, 73.77; H, 9.30; N, 10.64.

EXAMPLE 5

1-[2-hydroxy-4-(4-phenyl-1,2,3,6-tetrahydropyridinyl)-butyl]-1-methylurea

1 - (4 - methylamino - 3 - hydroxybutyl)-4-phenyl-1,2,3,6-tetrahydropyridine (7.81 g.) was fused under nitrogen at 160–165° C. for one half hour with 2.18 g. of urea. The crude fusion product was recrystallized readily from methanol-ethyl acetate to give 7.06 g. (78% of theory) of product which melted at 133–135° C. The infrared and NMR (nuclear magnetic resonance) spectra were consistent with the structure and the material gave a single spot on TLC, (thin layer chromatography).

*Analysis.*—Calculated for $C_{17}H_{25}N_3O_2$ (percent): C, 67.29; H, 8.31; N, 13.85. Found (percent): C, 67.32; H, 8.18; N, 13.76.

EXAMPLE 6

1-(3-phthalimidopropyl)-4-phenyl-1,2,3,6-tetrahydropyridine hydrochloride

N-(3-bromopropyl)-phthalimide (213 g., 0.9 mole) was added to a toluene suspension of 200 g. $K_2CO_3$ and 143.7 g. (0.9 mole) 4-phenyl-1,2,3,6-tetrahydropyridine. The suspension was heated at gentle reflux overnight with stirring. The reaction was cooled, filtered, and the filtrate evaporated to a viscous oil. A sample of the oil was treated with ethereal HCl and the hydrochloride salt which formed was recrystallized from isopropanol and isopropyl ether. The hydrochloride salt melted at 150–152° C.

*Analysis.*—Calculated for $C_{22}H_{23}ClN_2O_2$ (percent): C, 69.01; H, 6.05; N, 7.31. Found (percent): C, 68.99; H, 6.01; N, 7.28.

EXAMPLE 7

1-methyl-3-[3-(4-phenyl-1,2,3,6-tetrahydropyridinyl)-propyl]-urea

Into an ether solution of 8.3 g. (0.038 mole) of 1-(3-aminopropyl) 4-phenyl-1,2,3,4-tetrahydropyridine in 300 ml. of dry ether there was introduced in dropwise fashion at 5° C. with stirring, an ether solution of 2.2 g. (0.038 mole) of methyl isocyanate. White crystals formed immediately. The reaction mixture was stirred at room temperature overnight and then filtered by suction. The white crystalline product which was recovered was recrystallized from aqueous ethanol and vacuum dried to yield 9.45 g. (92.1%), of white crystals, which melted at 121–122° C.

*Analysis.*—Calculated for $C_{16}H_{23}N_3O$ (percent): C, 70.30; H, 8.48; N, 15.37. Found (percent): C, 70.19; H, 8.44; N, 14.66.

EXAMPLE 8

1-(3-trifluoromethylphenyl)-3-[3-(4-phenyl-1,2,3,6-tetrahydropyridinyl)-propyl]-urea To an ether solution of 11.61 g. (0.05 mole) of 4-phenyl - 1 - (3 - aminopropyl)-1,2,5,6-tetrahydropyridine, there was added in dropwise fashion an ether solution of 10 g. (0.05 mole) of meta-trifluoromethylphenyl isocyanate in the cold with adequate stirring. The crystalline product formed immediately and was separated by filtration. The product was recrystallized from isopropanol-isopropyl ether several times and vacuum dried. White crystals which melted at 157–158° C. were obtained.

*Analysis.*—Calculated for $C_{22}H_{24}F_3N_3O$ (percent): C, 65.49; H, 6.00; N, 10.42. Found (percent): C, 65.52; H, 6.11; N, 10.54.

EXAMPLE 9

1-[3-(o-hydroxybenzylamino)-propyl] 141phenyl-1,3, 3,6-tetrahydropyridine dihydrochloride To a stirred solution of 163.0 g. (0.5 mole) of 1-[3-o-hydroxybenzylidineamino) - propyl] - 4 - phenyl - 1,2,3, 6-tetrahydropyridine in 900 ml. of absolute methanol there was added slowly a solution of 37.8 g. (1.0 mole) of sodium borohydride in 700 ml. of methanol. After the addition had been completed, the solution was refluxed for 15 minutes, cooled and treated with 1500 ml. of cold water. The oil which separated was extracted with benzene and the benzene extracts washed with water. The basic oil which remained after the solvent was evaporated amounted to 159 g.

A portion (18.0 g.) of the free base was dissolved in 200 ml. of isopropanol and treated with ethereal hydrogen chloride. The white crystalline salt which formed weighed 18.1 g. (79% yield) and melted at 224–226.5° C. The analytical sample softened at 221° C. and melted at 224.5–226.5° C. after it had been recrystallized from an isopropanolethanol mixture.

*Analysis.*—Calc'd for $C_{21}H_{28}N_2OCl$ (percent): C, 63.79; H, 7.14; N, 7.09. Found (percent): C, 63.87; H, 7.26; N, 7.04.

EXAMPLE 10

1-(3-methylcarbamoyloxypropyl)-4-phenyl-1,2,3,6-tetrahydropyridine hydrochloride To a solution of 15.2 g. (0.07 mole) of 1-(3-hydroxypropyl) - 4 - phenyl - 1,2,3,6 - tetrahydropyridine in 200 ml. of dry benzene there was added slowly a solution of 4.0 g. (0.07 mole) of methyl isocyanate in 30 ml. of dry benzene. The resulting solution was stirred for 16 hours at ambient temperature and the solvent was thereafter evaporated. The residue was dissolved in hot benzene and treated with isooctane. The white crystalline product which separated on cooling weighed 7.1 g. (37% yield) and melted at 84–85° C.

A portion (1.0 g.) of the free base was dissolved in ether and treated with an ether-hydrogen chloride solution. The crystalline product which formed on standing was recrystallized from isopropanol. The white solid weighed 1.0 g. and melted at 167–168° C.

*Analysis.*—Calc'd for $C_{16}H_{23}N_2O_2Cl$ (percent): C, 61.82; H, 7.46; N, 9.01. Found (percent): C, 62.03; H, 7.40; N, 9.00.

EXAMPLE 11

1-[3-(3-4,5-trimethoxyphenylcarbamoyloxy)-propyl]-4-phenyl-1,2,3,6-tetrahydropyridine Into a stirred solution of 3.3 g. (0.015 mole) of 1-(3-hydroxypropyl) - 4 - phenyl - 1,2,3,6 - tetrahydropyridine in 50 ml. of dry benzene at 25° C., there was introduced slowly, 3.1 g. (0.015 mole) of 3,4,5-trimethoxyphenyl isocyanate in 10 ml. of dry benzene. The mixture was stirred for 16 hours at ambient temperature and then treated with 100 ml. of isooctane. The tan crystalline product which formed was separated by filtration, a benzene solution of the tan product was treated with charcoal, and the solution filtered. The resulting white compound which was precipitated by the addition of isooctane to the benzene filtrate melted at 125–126° C. and weighed 4.5 g. (70% yield).

*Analysis.*—Calc'd for $C_{24}H_{30}N_2O_5$ (percent): C, 67.58; H, 7.09; N, 6.57. Found (percent): C, 67.69; H, 7.26; N, 6.66.

EXAMPLE 12

1-[3-(3,4,5-trimethoxybenzoyloxy)-propyl]-4-phenyl-1,2,3,6-tetrahydropyridine

A mixture of 6.5 g. (0.03 mole) of 1-(3-hydroxypropyl) - 4 - phenyl - 1,2,3,6 - tetrahydropyridine, 6.9 g. (0.03 mole) of 3,4,5-trimethoxybenzoyl chloride and 100 ml. of chloroform was refluxed gently for 16 hours. After the solvent was distilled off at reduced pressure, the residual oil crystallized on standing and the solid was recrystallized from an ethyl acetate-isopropanol mixture. The white product which was recovered melted at 144.5–147.5° C. and weighed 7.8 g. (58% yield). The analytical sample melted at 146–148° C. following recrystallization from the same solvent system.

*Analysis.*—Calc'd for $C_{24}H_{30}NO_5Cl$ (percent): C, 64.35; H, 6.75; N, 3.13. Found (percent): C, 64.42; H, 6.78; N, 3.14.

Utilizing the method described above in Example 12, 1 - (3 - benzoyloxypropyl) - 4 - phenyl - 1,2,3,6 - tetrahydropyridine is prepared using benzoyl chloride instead of 3,4,5-trimethoxybenzoyl chloride.

EXAMPLE 13

1-(3-ethylcarbamoyloxypropyl)-4-phenyl-1,2,3,6-tetrahydropyridine hydrochloride

To a stirred solution of 4.3 g. (0.02 mole) of 1-(3-hydroxypropyl) - 4 - phenyl - 1,2,3,6 - tetrahydropyridine in 50 ml. of dry benzene there was added slowly a solution of 1.4 g. (0.02 mole) of ethyl isocyanate in 15 ml. of dry benzene. The resulting solution was stirred for 40 hours at room temperature and finally refluxed for one hour. After the solvent had been evaporated, the residue crystallized. It was recrystallized from an isooctane-benzene mixture. The product weighed 4.1 g. (72% yield) and melted at 80–81° C.

A portion (1.0 g.) of the free base was dissolved in ether and treated with an ether-hydrogen chloride solution. The crystalline product which formed on standing was recrystallized from isopropanol-isopropyl ether. The white solid weighed 1.1 g. and melted at 157–158° C.

*Analysis.*—Calc'd for $C_{17}H_{25}ClN_2O_2$ (percent): C, 62.85; H, 7.76; N, 8.63. Found (percent): C, 62.95; H, 7.93; N, 8.48.

EXAMPLE 14

1-(3-phenylcarbamoyloxypropyl)-4-phenyl-1,2,3,6-tetrahydropyridine

To a solution of 3.2 g. (0.015 mole) of 1-(3-hydroxypropyl)-4-phenyl-1,2,3,6-tetrahydropyridine in 50 ml. of dry benzene at 25 C. there was added slowly a solution of 1.8 g. (0.015 mole) of phenyl isocyanate in 10 ml. of dry benzene. The resulting solution was stirred for 16 hours under an atmosphere of nitrogen at ambient temperature and then treated with 50 ml. of isooctane. The white crystalline product which thereby formed was separated by filtration and recrystallized from a benzene-isooctane mixture. The product melted at 141–143° C. and weighted 4.0 g. (73% yield).

*Analysis.*—Calc'd for $C_{21}H_{24}N_2O_2$ (percent): C, 74.97; H, 7.19; N, 8.33. Found (percent): C. 74.76; H, 7.26; N, 8.49.

EXAMPLE 15

1-[3-phenylcarbamoyloxy)-propyl]-4-(m-trifluoromethylphenyl)-1,2,3,6-tetrahydropyridine To a stirred solution of 5.7 g. (0.02 mole) of 1-(3-hydroxypropyl) - 4 - (m - trifluoromethylphenyl-1,2,3,6-tetrahydropyridine in 50 ml. of dry benzene at 25° C. there was slowly added a solution of 2.4 g. (0.02 mole) of phenyl isocyanate in 25 ml. of dry benzene. The resulting solution was stirred under an atmosphere of nitrogen at ambient temperature for 16 hours. After the solvent was evaporated at reduced pressure, the residual oil was treated with 50 ml. of isooctane. The crystalline product was separated by filtration and recrystallized from isooctane. The white compound weighed 7.0 g. (86% yield) and melted at 100–101 C.

*Analysis.*—Calcd. for $C_{22}H_{23}N_2O_2F_3$ (percent): C, 65.35; H, 5.73; N, 6.93. Found (percent): C, 65.29; H, 5.51; N, 6.92.

EXAMPLE 16

1-[3-(3,4,5-trimethoxyphenylcarbamoyloxy) - propyl]-4-(m - trifluoromethylphenyl)-1,2,3,6-tetrahydropyridine hydrochloride To a stirred solution of 3.6 g. (0.012 mole) of 1-(3-hydroxypropyl) - 4 - (m - trifluoromethylphenyl)-1,2,3,6-tetrahydropyridine in 50 ml. of dry benzene at 25 C. there was added slowly a solution of 2.6 g. (0.012 mole) of 3,4,5-trimethoxyphenyl isocyanate in 20 ml. of dry benzene. The mixture was stirred for 16 hours at ambient temperature, filtered and the solvent evaporated at reduced pressure. The free base was dissolved in ether and treated with an ether-hydrogen chloride solution. The crystalline compound which formed on standing was separated by filtration and recrystallized from an isopropanol-isopropyl ether mixture. The white salt which was obtained weighed 3.7 g. (59% yield) and melted at 164–165° C.

*Analysis.*—Calcd. for $C_{25}H_{30}ClF_3N_2O_5$ (percent): C, 56.55; H, 5.69; N, 5.28. Found (percent): C, 56.30; H, 5.63; N, 5.32.

EXAMPLE 17

1-[3-(methylcarbamoyloxy)-propyl] - 4 - (m-trifluoromethylphenyl) - 1,2,3,6 - tetrahydropyridine hydrochloride To a stirred solution of 5.7 g. (0.02 mole) of 1-(3-hydroxypropyl) - 4 - (m - trifluoromethylphenyl)-1,2,3,6-tetrahydropyridine in 50 ml. of dry benzene at 25° C. there was slowly added a solution of 1.7 g. (0.03 mole) of methyl isocyanate in 15 ml. of dry benzene. The resulting solution was stirred for 16 hours at ambient temperature and then the solvent was evaporated. The residue which crystallized on standing weighed 5.8 g. (88% yield) and melted at 60–64° C. The free base was dissolved in ether and treated with an ether-hydrogen chloride solution. The crystalline product which formed was recrystallized from an isopropanol-isopropyl ether mixture. The white salt thereby obtained melted at 159–161° C. and weighed 4.2 g.

*Analysis.*—Calcd. for $C_{17}H_{22}ClF_3N_2O_2$ (percent): C, 53.90; H, 5.85; N, 7.40. Found (percent): C, 53.74; H, 5.73; N, 7.32.

Utilizing the method of Example 17, the following compounds are prepared from the stated ingredients.

1-[3-(methylcarbamoyloxy)-propyl] - 4 - (4 - ethylphenyl) - 1,2,3,6 - tetrahydropyridine from 4-(4-ethylphenyl)-1-(3 - hydroxypropyl)-1,2,3,6-tetrahydropyridine and methyl isocyanate.

1-[3-(phenylcarbamoyloxy)-propyl] - 4 - (4 - methoxyphenyl)-1,2,3,6-tetrahydropyridine from 1-(3-hydroxypropyl)-4-(4-methoxyphenyl) - 1,2,3,6 - tetrahydropyridine and phenyl isocyanate.

1-[2-(phenylcarbamoyloxy)-ethyl] - 4 - phenyl-1,2,3,6-tetrahydropyridine from 1-(2-hydroxyethyl)-4-phenyl-1,2,3,6-tetrahydropyridine and phenyl isocyanate.

1-[4-(phenylcarbamoyloxy)-butyl] -4 - phenyl-1,2,3,6-tetrahydropyridine from 1-(4-hydroxybutyl)-4-phenyl-1,2,3,6-tetrahydropyridine and phenyl isocyanate.

The following procedure illustrates the process of administering an arylpyridinyl-alkyl alcohol and an arylpyridinyl-alkylamine derivative represented by Formula I to a mammalian host having symptomatology diagnosed as requiring tranquilizing or hypotensive treatment, but not requiring restraint:

A capsule or tablet or other pharmaceutical form containing an effective dose of the medicament in the solid state, for example, from 5 to 50 mg., is administered via the oral route every 4 to 6 hours, or more often if need be. Initially, it is sometimes desirable to give a large dose—for example, one, two or three times the above dose—in order to obtain a pronounced initial effect. For example, for a host weighing 60–70 kg., a dose of from about .35 mg./kg./day to about 1.5 mg./kg./day is sufficient to give the required therapeutic effect.

The initial and subsequent doses of arylpyridinyl-alkyl alcohol derivative tranquilizer can also be administered parenterally by intramuscular or subcutaneous injection when desired. A water-soluble salt of an arylpyridinyl-alkyl alcohol derivative is particularly useful for purposes of injection. In general, the dose required for parenteral administration is somewhat less than that required to provide an equal effect by oral administration.

A further mode of evoking tranquilizing action by the administration of an arylpyridinyl-alkyl alcohol derivative is that of maintaining a small daily maintenance dose of about .35 mg./kg./day to about .70 mg./kg./day, but increasing this dose in times of stress.

The various pharmaceutical forms referred to above are prepared by methods well known to the art. For example, a solid dosage form can comprise a gelatin capsule containing a dose amount of a compound of Formula I mixed with a quantity of starch or other solid pharmaceutical extending medium. Alternatively, a binder such as stearic acid or magnesium stearate can be added to the mixture of starch and drug and the whole pressed into tablet form. Parenteral dosage forms are obtained by dissolving a water-soluble salt of the active drug in water or saline solution in a concentration such that 1 cc. of the solution can then be filled into 1 cc. ampules or larger multiple dose ampules.

The following examples illustrate the preparation of suitable dosage forms.

Filled gelatine capsules can be prepared by mixing one pound of 1-(3-methylcarbamoylpropyl)-4-phenyl-1,2,3,6-tetrahydropyridine hydrochloride with 64 pounds of starch and filling the mixture into empty telescoping capsules of such size that each capsule contains 5 mg. of drug.

Tablets can be prepared as follows: 20 parts of 1-(3-methylcarbamoyloxypropyl) - 4 - phenyl-1,2,3,6-tetrahydropyridine, 35 parts of starch, 35 parts of milk sugar, 4 parts of sodium carboxymethylcellulose and 1 part of magnesium stearate (all parts by weight) are thoroughly mixed and the mixture is then compressed into scored 100 mg. tablets, each tablet containing 20 mg. of the active drug.

Ampules containing an injectable solution are prepared as follows:

50 liters of a solution containing 5 mg. per ml. of 1-(3-methylcarbamoyloxypropyl) - 4 - phenyl-1,2,3,6-tetrahydropyridine in the form of its hydrochloride salt is prepared in distilled water, and 5 mg. of sodium chloride per ml. are dissolved therein to provide a substantially isotonic solution. The solution is sterilized by filtering it through a Seitz filter, and is then filled with aseptic technique into 1 cc. ampules.

Various modifications and equivalents will be apparent to one skilled in the art and may be made in the compounds, methods, compositions and procedures of the present invention without departing from the spirit or scope thereof, and it is therefore to be understood that the invention is to be limited only by the scope of the appended claims.

I claim:

1. A compound selected from the group consisting of (a) organic bases having the formula:

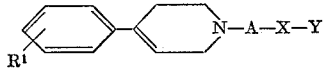

wherein

R' is a member selected from the group consisting of hydrogen, lower alkyl, lower alkoxy and trifluoromethyl, A is a member selected from the group consisting of alkylene having 2–4 carbon atoms and hydroxy substituted alkylene having 4 carbon atoms, X is —NR$^2$—C(O)—, wherein R$^2$ is a member selected from the group consisting of hydrogen and lower alkyl, Y is —NR$^3$R$^4$ wherein R$^3$ and R$^4$ each represent a member selected from the group consisting of hydrogen, lower alkyl or one of said terms, R$^3$ and R$^4$ represents phenyl, trifluoromethylphenyl, loweralkoxyphenyl and the other represents hydrogen, and (b) pharmaceutically acceptable salts thereof.

2. A compound according to claim 1 designated 1-[2-hydroxy - 4 - (4 - phenyl-1,2,3,6-tetrahydropyridinyl) butyl]-3-methylurea.

3. A compound according to claim 1 designated 1-methyl-3-[3-(4-phenyl - 1,2,3,6 - tetrahydropyridinyl)-propyl]-urea.

4. A compound according to claim 1 designated 1-(3-trifluoromethylphenyl)-3-[3-(4-phenyl 1,2,3,6 - tetrahydropyridinyl)-propyl]-urea.

No references cited.

HENRY R. JILES, Primary Examiner

A. L. ROTMAN, Assistant Examiner

U.S. Cl. X.R.

260—297; 424—266